United States Patent Office 3,842,164
Patented Oct. 15, 1974

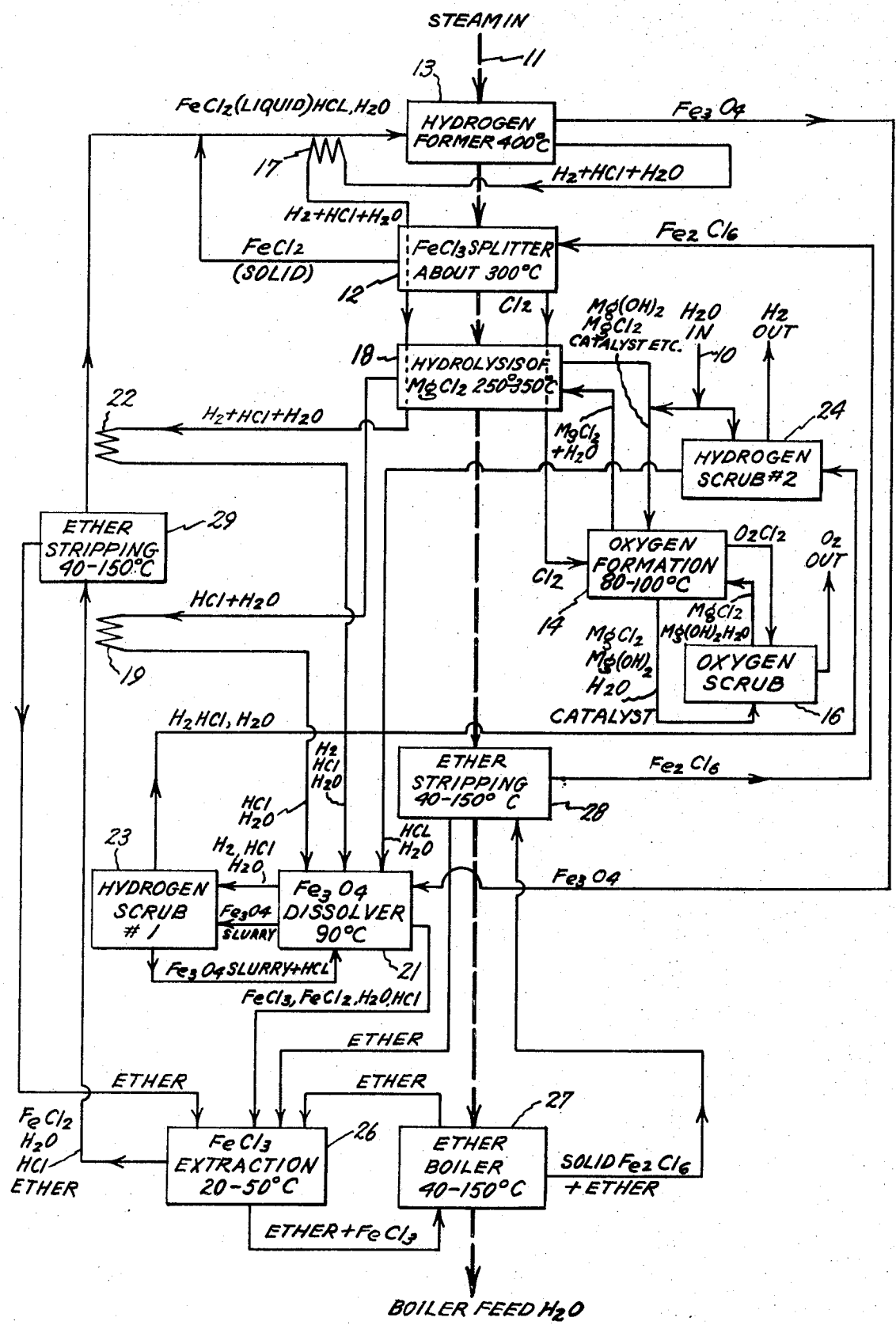

3,842,164
CLOSED-CYCLE THERMOCHEMICAL PRODUCTION OF HYDROGEN AND OXYGEN
Robert H. Wentorf, Jr., Schenectady, N.Y., assignor to General Electric Company
Filed Feb. 1, 1973, Ser. No. 328,758
Int. Cl. C01b 1/03, 13/00
U.S. Cl. 423—579   5 Claims

ABSTRACT OF THE DISCLOSURE

A multi-step closed-cycle thermochemical process for the generation of hydrogen and oxygen is described utilizing Fe-Ha-O-H chemistry, wherein Ha represents chlorine or bromine. For the chlorine version, the prime thermal dissociation reaction of $$Fe_2Cl_6 \rightarrow 2FeCl_2 + Cl_2$$

is interconnected with a series of reactions via which the $FeCl_2$ in the presence of steam at about 400° C. or higher is used to generate an acid and hydrogen-containing gas flow from water; the chlorine (together with magnesium compounds and catalyst) is used to generate oxygen from water, and acid-containing gas flows in tandem with ether extraction are used to regenerate and recover $FeCl_3$ (as $Fe_2Cl_6$) to complete the cycle.

BACKGROUND OF THE INVENTION

Concern has already been expressed that a major energy crisis is expected to occur in the United States in the next ten to fifteen years. Although the crisis may be alleviated by the massive import of oil and gas, such a solution would greatly aggravate the already serious problem of balance of payments faced by the United States. One far more desirable solution that has been proposed is the large scale production of hydrogen.

Hydrogen usage in the United States has grown at an average annual rate of 15% for the past 25 years. Large scale use of hydrogen is currently restricted to ammonia production (42%), hydrocarbon refining (38%), metallurgical (about 7%), and food processing (about 5%).

At least five methods for the production of hydrogen have reached a substantial level of usage:

(a) natural gas reforming methods,
(b) the reforming of petroleum naphthas,
(c) partial oxidation of hydrocarbons,
(d) the reforming of coal or coke and
(e) the electrolysis of water.

Of these methods, the reforming of natural gas is the most economical. Reformed gaseous industrial grade hydrogen is at present typically priced in the range 75–79¢/million B.t.u. However, the sharp rise in prices expected to occur for methane and similar petroleum products due to the pending massive shortage will scale this price up to a substantially higher value in the future.

It will be particularly desirable to provide new multi-step closed-cycle thermochemical processes in which, ideally, only heat and water are added to the system and hydrogen and oxygen are removed therefrom. The maximum operating temperature should not exceed about 1100° K. (a maximum value roughly equal to the temperature of steam deliverable by high temperature gas technology).

The Euratom thermochemical hydrogen process (referred to as the Mark I process) has been proposed as one such process. The Mark I process uses calcium, bromine, and mercury compounds to decompose water. The maximum temperature required has been indicated as being 727° C., the temperature attainable in the steam discharge from a high temperature gas reactor. The Mark I process has major disadvantages including corrosion, the high cost of mercury and the volatility thereof. The loss of significant amounts of mercury to the atmosphere appears certain to occur in the course of repeated cycling, adding to the expense of the process and creating a severe ecological hazard.

It is the prime object of this invention to provide an improved multi-step closed-cycle thermochemical process not only satisfactorily meeting the above thermodynamic constraints, but also meeting constraints relating to kinetics, ecological and safety factors, economics, reliability and material availability.

SUMMARY OF THE INVENTION

The improved multi-step closed-cycle thermochemical process for the generation of hydrogen and oxygen disclosed herein utilizes Fe-Ha-O-H chemistry, the "Ha" representing chlorine or bromine. Where Ha represents chlorine, the prime thermal dissociation reaction $$Fe_2Cl_6 \rightarrow 2FeCl_2 + Cl_2$$

produces individual reactants for the decomposition of water. Thus, the $FeCl_2$ reacts with water at about 400° C. and above to generate an acid and hydrogen-containing gas flow, and the chlorine (together with a closed magnesium sub-cycle) is used to generate oxygen from water. Acid-containing gas flows acting in tandem with a closed ether extraction cycle are used to regenerate and recover $FeCl_3$ to complete the cycle.

BRIEF DESCRIPTION OF THE DRAWING

The exact nature of this invention as well as other objects and advantages thereof will be readily apparent from consideration of the following specification relating to the annexed drawing schematically setting forth a flow diagram of the multi-step closed-cycle thermochemical process of this invention.

DESCRIPTION OF THE PREFERRED EMBODIMENT

The inputs to the closed-cycle process shown in the drawing are water and heat. The entry of water into the system is represented by the arrow identified by numeral 10 and heat flow entering the system is identified by arrow 11. The heat flow may be provided, for example, by steam output from a nuclear reactor of the water-cooled, liquid metal or high temperature gas types. The medium for carrying heat into and through the system is shown by a distinctive dashed line, the reactions served thereby being shown in order of decreasing temperature of reaction from the top to the bottom of the drawing.

Broadly considered, iron and chlorine in various forms are utilized at different points in the process to decompose water into hydrogen and oxygen. The iron and chlorine circulate through the system in separate sub-cycles as will be described hereinbelow.

The preparation of the iron and chlorine water-decomposing components are generated by thermal decomposition at position 12 in the cycle. Ferric chloride, $FeCl_3$ melts at a little under 300° C. and boils (1 atmosphere) a few degrees higher. Below about 400° C. and when not in solution, ferric chloride occurs mainly as the dimer, $Fe_2Cl_6$. In the temperature range of 150–350° C. the dimer partially cracks into $FeCl_2$ and chlorine according to the following reaction:

$$Fe_2Cl_6 \rightleftharpoons 2FeCl_2 + Cl_2.$$

The heat of sublimation of $Fe_2Cl_6$ is about 32 kcal./g. mole and the heat of the decomposition is about 22 kcal./g. mole, endothermic. The dimer is easily purified by sublimation.

FeCl₂ melts at about 674° C. and its vapor pressure at 300° C. is rather low. Thus, at the temperature employed, about 300° C., for the decomposition of the dimer, FeCl₂ separates as a solid from the mixture. FeCl₂ is removed from reactor 12 and added to the reactant stream (FeCl₂, HCl and H₂O) entering reactor 13 to bring about hydrogen formation therein. At the same time, chlorine liberated in reactor 12 is conducted to reactor 14 for interaction with the circulating slurry of magnesium hydroxide, catalyst and H₂O. The chemical reactions occurring in reactor 14 include:

2Cl₂ + Mg(OH)₂ ⟶ Mg(OCl)₂ + 2HCl

Mg(OH)₂ + 2HCl ⟶ MgCl₂ + 2H₂O

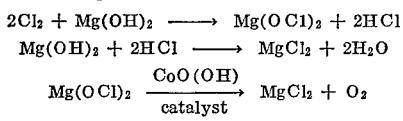

A stream containing MgCl₂, Mg(OH)₂, H₂O and catalyst is transported to the oxygen scrub unit 16 to remove chlorine from the gaseous mixture of oxygen and chlorine conducted from reactor 14 to scrub unit 16. The product oxygen, free of the chlorine, then leaves scrub unit 16 for collection thereof.

The stream of FeCl₂, HCl and H₂O entering hydrogen former 13 reacts at an unexpectedly low temperature in the range of 350–500° C. The heat for the resulting reactions is provided by the incoming hot flow 11, typically steam from a nuclear reactor. The reaction between ferrous chloride and water that follows results in splitting of the water to produce hydrogen according to the following reaction:

3FeCl₂ + 4H₂O → Fe₃O₄ + 6HCl + H₂.

As a result of this reaction, products leaving reactor 13 are solid Fe₃O₄, to be circulated through a sub-cycle as described hereinbelow for reconversion to ferrous chloride, and a hot gas mixture of hydrogen, hydrogen chloride, and steam. The sensible heat contained by this gas stream is used at several points in the process, the hot gas mixture first passing through heat exchanger 17 to preheat the mixture entering reactor 13. Thereafter, the hot gas mixture is used to help provide heat for the thermal decomposition of ferric chloride in reactor 12. Next, the gas mixture, somewhat reduced in temperature, is employed to provide heat for the hydrolysis of magnesium chloride in reactor 18. As shown, the hot chlorine gas from the decomposition of Fe₂Cl₆ in reactor 12 is also used to heat reactor 18 on its way to reactor 14.

Reactor 18 forms part of the sub-cycle utilized in the decomposition of water to produce oxygen. Thus, the stream of magnesium chloride, catalyst and steam leaving the oxygen former reactor 14 is conducted to reactor 18 for hydrolysis of the magnesium chloride at a temperature in the 250–350° C. range. The reactions occurring therein include:

MgCl₂ + H₂O → MgOCHl + HCl

The magnesium compounds leaving reactor 18 are quite varied (e.g. MgO, MgOHCl, Mg(OH)₂, Mg₂OCl₂ and MgCl₂). However, as the temperature of these products drops on the way to reactor 14, the predominate magnesium compound is Mg(OH)₂, to which water is added by way of inlet 10. Catalyst salt(s), such as cobalt or nickel salts, which may be added to the system as chloride or bromides, also circulate in the slurry passing through the sub-cycle of reactors 14, 16, 18. This mixture enters reactor 14 as described hereinabove for the reaction with chlorine from reactor 12.

A hot gaseous stream consisting of hydrogen chloride and steam leaves reactor 18, passes through heat exchanger 19 and enters the magnetite dissolver, reactor 21. Similarly, the hot gas stream consisting of hydrogen, hydrogen chloride and steam leaving the heating circuit of reactor 18 passes through the heat exchanger 22 and enters reactor 21. Magnetite, the Fe₃O₄ product from hydrogen former 13 is also transported to reactor 21, where at a temperature of about 90° C., the magnetite dissolves in the hydrogen chloride water mixture. Fe₃O₄ slurry is circulated to hydrogen scrub unit No. 1 identified by numeral 23. The H₂, HCl, H₂O mixture from reactor 21 is bubbled through the Fe₃O₄ slurry and the slurry picks up some of the HCl for return to reactor 21.

The gas mixture, predominantly hydrogen, but also containing some hydrogen chloride and water vapor, exits from scrub unit 23 and is conducted to scrub unit No. 2 represented by numeral 24. Incoming water via inlet 10 is used to scrub the remainder of the hydrogen chloride and water from the gas stream entering unit 24 thereby producing hydrogen output, which is then collected. The HCl and water form part of the input to reactor 21 for the dissolution of the Fe₃O₄.

Ferric chloride, ferrous chloride, water and HCl in solution pass from dissolver unit 21 to extraction unit 26 where this mixture at a temperature in the 20–50° C. range is contacted with a suitable ether such as diethyl, diisopropyl, n-propyl or n-butyl ether. The ether selected should have a solubility in water not exceeding about 7.5% at 25° C. The FeCl₃ is preferentially soluble in the ether phase, and the ether extracts FeCl₃ from the acid aqueous solution. The ether input comes via several recycling routes. Thus, the mixture of ether and dissolved FeCl₃ leaves extraction unit 26 and enters the ether boiler 27 heated to a temperature in the 40–150° C. range (above the boiling point of the ether employed) by the heat flow entering the system at point 11 continuing on its passage through the process. Some of the ether content received from extraction unit 26 leaves boiler 27 and is directly returned to unit 26; the balance of the ether, together with solid ferric chloride, is circulated to the ether stripping unit 28, where at a temperature in the 40–150° C. range, the rest of the ether is separated from the ferric chloride, which is recirculated to reactor 12 for thermal decomposition thereof while the ether is recirculated to extraction unit 26. Additional ether is returned to extraction unit 26 after recovery thereof in stripping unit 29 at a temperature in the 40–150° C. range from the flow of ferrous chloride, water, HCl and ether leaving extraction unit 26 and passing into ether stripping unit 29. The flow of ferrous chloride, water and HCl stripped of its ether content proceeds as material input to reactor 13 to complete the cycle.

Although the series of reactions described hereinabove constitute the preferred embodiment of this invention, other reactions may be substituted in the subcycles. Thus, oxygen can be produced from the reaction of water and chlorine at temperatures ranging from about 500–600° C., or at ordinary temperatures via hypochlorites other than magnesium hypochlorite. In the hot chlorine/water production of oxygen the reaction is as follows:

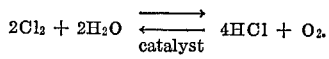

This reaction is catalyzed by CuCl, NiCl₂, CoCl₂, etc. However, this reaction has disadvantages, such as the low value of oxygen concentration at equilibrium, the corrosion problem at higher temperatures, and the problem of separating the oxygen from the gas mixture.

Also, for the production of hydrogen in reactor 13, this may be accomplished by the decomposition of water at temperatures in the 100–300° C. range utilizing Fe(OH)₂, which may be obtained by reacting ammonia or basic magnesium chlorides with aqueous FeCl₂, or by the decomposition of HCl at higher temperatures by the reaction of FeCl₂ with HCl.

If bromine is used in place of chlorine, it is somewhat easier to liberate bromine from ferric bromide than to liberate chlorine from ferric chloride; however, there is greater difficulty in obtaining hydrogen from the reaction between ferrous bromide and water or in obtaining oxygen from the reaction between bromine and water.

The technology is well known for moving all of the various reactants (gases, liquids, slurries, solids) in the circuits shown.

Several alternate methods may be employed in the conduct of the thermal decomposition of ferric chloride dimer in reactor 12. Thus, dry dimer liquid can be fed into reactor 12 under a slight pressure to inhibit cracking and chlorine resulting from the decomposition will depart at the lower pressure prevailing in reactor 12 while ferrous chloride precipitates therein. The ferrous chloride is then filtered and removed and the $Fe_2Cl_6$ is recycled. In another approach, dimer can be fed to one of a pair of reactors for a given period of time permitting the solid ferrous chloride formed to accumulate while chlorine and excess dimer vapor pass off. When sufficient ferrous chloride has accumulated in the first reactor, the dimer input would be shifted to the second reactor while the first reactor is used for the reaction of $FeCl_2$ with steam. Thereafter, when sufficient $FeCl_2$ has accumulated in reactor No. 2, the procedure is reversed. The resulting dimer and chlorine are easily separated by liquefying or freezing the dimer.

The corrosion conditions encountered in this process are relatively mild owing to the relatively low temperatures involved, and many corrosion resistant construction materials such as glass, ceramics, plastics will suffice as containers and conduits.

Although water is shown entering the system via the hydrogen scrub No. 2 (as well as along with the $Mg(OH)_2$ entering reactor 14), water can be admitted via oxygen scrub No. 16 and/or hydrogen scrub No. 1 or at other locations at which it may be desired to reduce the temperature.

The $Fe_3O_4$ dissolver 21 and the hydrogen scrubbers may be operated at higher than atmospheric pressure in order to increase the reaction temperature and reaction velocity or to reduce the content of HCl and $H_2O$ in the hydrogen stream. However, the temperature must not be too high or else the hydrogen will be partially wasted in reducing the ferric iron present in reactor 21 and scrubber 23. Temperatures below 200° C. are considered suitable.

What I claim as new and desire to secure by Letters Patent of the United States is:

1. A process for the generation of hydrogen and oxygen comprising the steps of:
    (a) reacting ferrous halide selected from the group consisting of ferrous chloride and ferrous bromide with steam at a temperature in excess of about 350° C. to produce solid iron oxide and a first gaseous mixture containing hydrogen, the respective hydrogen halide and steam,
    (b) removing and cooling said first gaseous mixture,
    (c) bringing the cooled first gaseous mixture into contact with the iron oxide formed to bring about dissolution thereof and produce a second gaseous mixture similar to said first mixture with reduced hydrogen halide content,
    (d) separating and collecting hydrogen gas from said second gaseous mixture,
    (e) removing the solution of ferrous halide, the respective ferric halide, water and hydrogen halide resulting from said dissolution,
    (f) extracting ferric halide from said solution,
    (g) recovering ferrous halide, water and hydrogen halide mixture from the ferric halide-depleted mixture,
    (h) recirculating and heating the ferrous halide, water, hydrogen halide mixture for the conduct of step (a),
    (i) thermally decomposing the extracted ferric halide at a temperature of about 300° C. to produce ferrous halide and the respective halogen, said ferrous halide being added to the heated ferrous halide, water, hydrogen halide mixture being recirculated,
    (j) reacting the halogen with water and magnesium hydroxide in the presence of a catalyst for decomposition of the water and
    (k) recovering and collecting oxygen gas produced thereby.

2. The process of claim 1 wherein magnesium-containing material resulting from the halogen/water reaction is hydrolyzed at a temperature in the 250–350° C. range to regenerate magnesium hydroxide.

3. The process of claim 1 wherein an ether is employed to extract the ferric halide, being stripped from the ferric halide and recirculated.

4. The process of claim 3 wherein the ether employed is diethyl ether.

5. The process of claim 1 wherein the catalyst for the halogen/water reaction is selected from the group consisting of cobalt salts and nickel salts.

References Cited

UNITED STATES PATENTS

| | | | |
|---|---|---|---|
| 1,763,781 | 6/1930 | Heath et al. | 423—493 |
| 3,567,378 | 3/1971 | Ferris | 423—635 |

FOREIGN PATENTS

| | | | |
|---|---|---|---|
| 447,688 | 1/1913 | France | 423—657 |

OTHER REFERENCES

Mellor: A Comprehensive Treatise on Inorganic and Theoretical Chemistry, Vol. 14, Part 3 (1935), p. 21 & p. 65.

Jacobson: Encyclopedia of Chemical Reactions, Vol. IV, (1951), p. 106

EARL C. THOMAS, Primary Examiner

H. S. MILLER, Assistant Examiner

U.S. Cl. X.R.

423—657